United States Patent [19]

Carnes, Sr. et al.

[11] Patent Number: 5,775,673
[45] Date of Patent: Jul. 7, 1998

[54] LOAD BINDER TOOL

[75] Inventors: Melvin R. Carnes, Sr.; Jeffrey S. Carnes, both of Sunland, Calif.

[73] Assignee: Binder Jac, L.C., Hampton, Va.

[21] Appl. No.: 646,726

[22] Filed: May 3, 1996

Related U.S. Application Data

[63] Continuation-in-part of Ser. No. 38,476, May 5, 1995.

[51] Int. Cl.⁶ .................................................. B66F 3/00
[52] U.S. Cl. ........................ 254/131; 254/120; 254/121; 254/123
[58] Field of Search .................. 254/131, 120, 254/121, 123

[56] References Cited

U.S. PATENT DOCUMENTS

| | | | |
|---|---|---|---|
| 1,452,205 | 4/1923 | Madsen | 254/120 |
| 1,747,330 | 2/1930 | Stormont | 254/121 |
| 3,110,959 | 11/1963 | Blackstone | 254/131 |
| 3,615,073 | 10/1971 | Lickey | 254/131 |
| 4,756,181 | 7/1988 | Appelgren | 254/120 |

FOREIGN PATENT DOCUMENTS 1255874   12/1971   United Kingdom ............ 254/131

*Primary Examiner*—James G. Smith
*Assistant Examiner*—Lee Wilson
*Attorney, Agent, or Firm*—Peter J. Van Bergen

[57] ABSTRACT

A load binder tool is provided for use with a lever-type load binder. The tool includes a base member and a handle member. The handle member is pivotally mounted to the base member at a pivot point between the first and second end of the handle member. A portion of the handle member defines a generally U-shaped cradle open at the first end and terminating at an end wall prior to the pivot point. The U-shaped cradle is sized to receive the lever of the lever-type load binder. The base member acts as a fulcrum as the handle member is pivoted about the pivot point such that the U-shaped cradle raises the load binder's lever from its locked position. The U-shaped cradle allows the lever to freely snap into its unlocked position without requiring any portion of the tool to travel therewith.

13 Claims, 5 Drawing Sheets

LOAD BINDER TOOL

This is a continuation-in-part of copending application Ser. No. 29/038,476 filed May 5, 1995.

FIELD OF THE INVENTION

The invention relates generally to load binder tools, and more particularly to a load binder tool that keeps all user body parts away from a load binder handle that is being unlocked.

BACKGROUND OF THE INVENTION

Load binders are used in the transportation industry, e.g., trucking, for tensioning and securing load-enveloping chains. In general, a load binder tensions a chain as a handle locks down over a center position of the binder. To unlock the load binder and release the tension in the chain, the handle must be moved from its locked position.

A substantial amount of force is generally required to unlock the load binder. Accordingly, a load binder "tool" is generally used in cooperation with the load binder's handle to increase one's leverage when releasing the chain binder. In addition, the load binder handle tends to snap with great force as the tension in the chain is released. Load binder tools typically embody a simple hollow pipe or a specially-constructed handle extension. However, in the prior art load binder tools, the pipe or handle extension moves with the load binder handle as it is being unlocked. Thus, the user runs the risk of positioning at least some portion of his or her body in the path of the great releasing force thereby risking injury.

SUMMARY OF THE INVENTION

Accordingly, it is an object of the present invention to provide a load binder tool that allows a user to release a locked lever-type load binder in complete safety.

Another object of the present invention is to provide a load binder tool that is simple to use.

Still another object of the present invention is to provide a load binder tool that can also be used to lock a lever-type load binder.

Other objects and advantages of the present invention will become more obvious hereinafter in the specification and drawings.

In accordance with the present invention, a tool is provided for use with a lever-type load binder. The tool includes a base member and a handle member. The handle member has a first and second end and is pivotally mounted to the base member at a pivot point between the first and second end. A portion of the handle member defines a generally U-shaped cradle open at the first end and terminating at an end wall prior to the pivot point. The U-shaped cradle is sized to receive the lever of the lever-type load binder. In operation, the base member sits astride a chain leading to the load binder while the U-shaped cradle is positioned under the load binder's lever. The base member acts as a fulcrum as the handle member is pivoted about the pivot point such that the U-shaped cradle raises the load binder's lever from its locked position. The U-shaped cradle allows the lever to freely snap into its unlocked position without requiring any portion of the tool to travel therewith. As a result, the user need not risk placing any body parts in the vicinity of the lever as the tension force in the chain leading to the load binder is released.

BRIEF DESCRIPTION OF THE DRAWINGS

FIG. 7A is a side view of the tool being positioned over a tensioned chain adjacent a locked load binder;

FIG. 7B is a side view of the tool as it is positioned under the load binder's lever;

FIG. 7C is a side view of the tool as it is moved to position the tools base astride the chain; and FIG. 7D is a side view of the tool as it is operated to unlock the load binder.

DETAILED DESCRIPTION OF THE INVENTION

Figure 1:
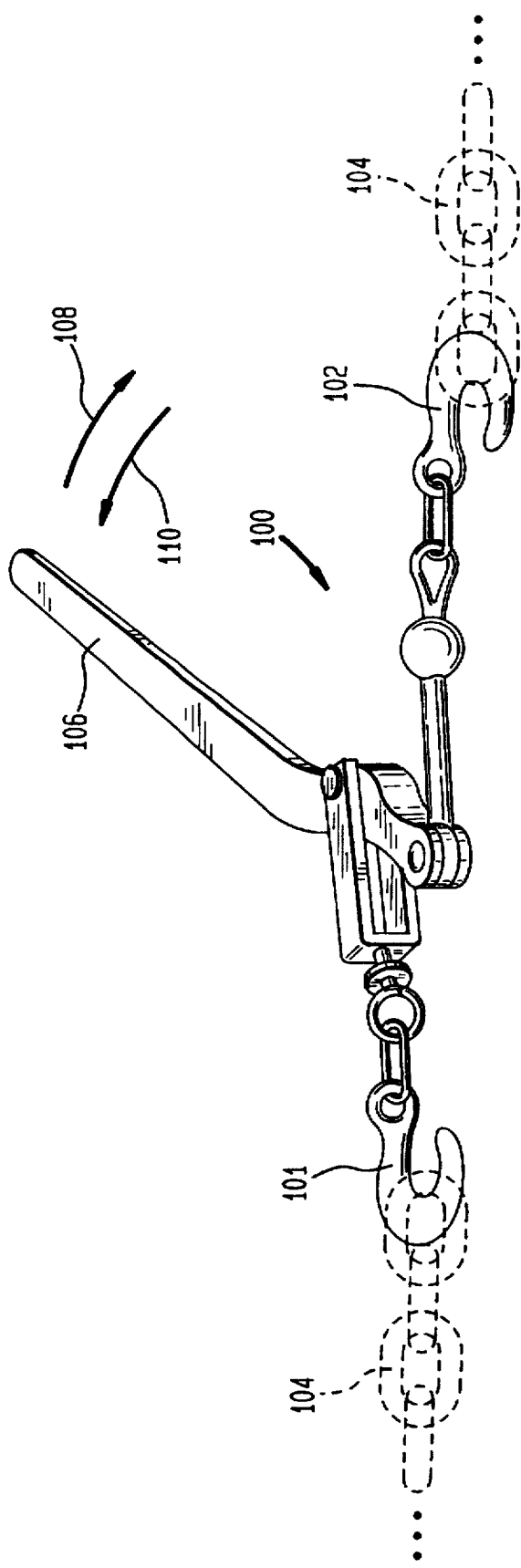
FIG. 1 is a perspective view of a lever-type load binder depicted between its fully open and fully locked position.

Referring now to the drawings, and more particularly to FIG. 1, a standard lever-type load binder is shown and referenced generally by numeral 100. In general, load binder 100 is provided with hooks 101 and 102 that cooperate with a length of chain 104 (shown in phantom) that is to be wrapped about freight (not shown). As is well known in the art, load binder 100 is used to place chain 104 under tension as lever 106 is moved in the direction of arrow 108. Tension on chain 104 is maintained as lever 106 locks down in a position substantially parallel with chain 104. When lever 106 is moved in the direction of arrow 110, tension in chain 104 is relaxed. This release of tension generally causes lever 106 to snap with great force in the direction of arrow 110.

Figure 2:
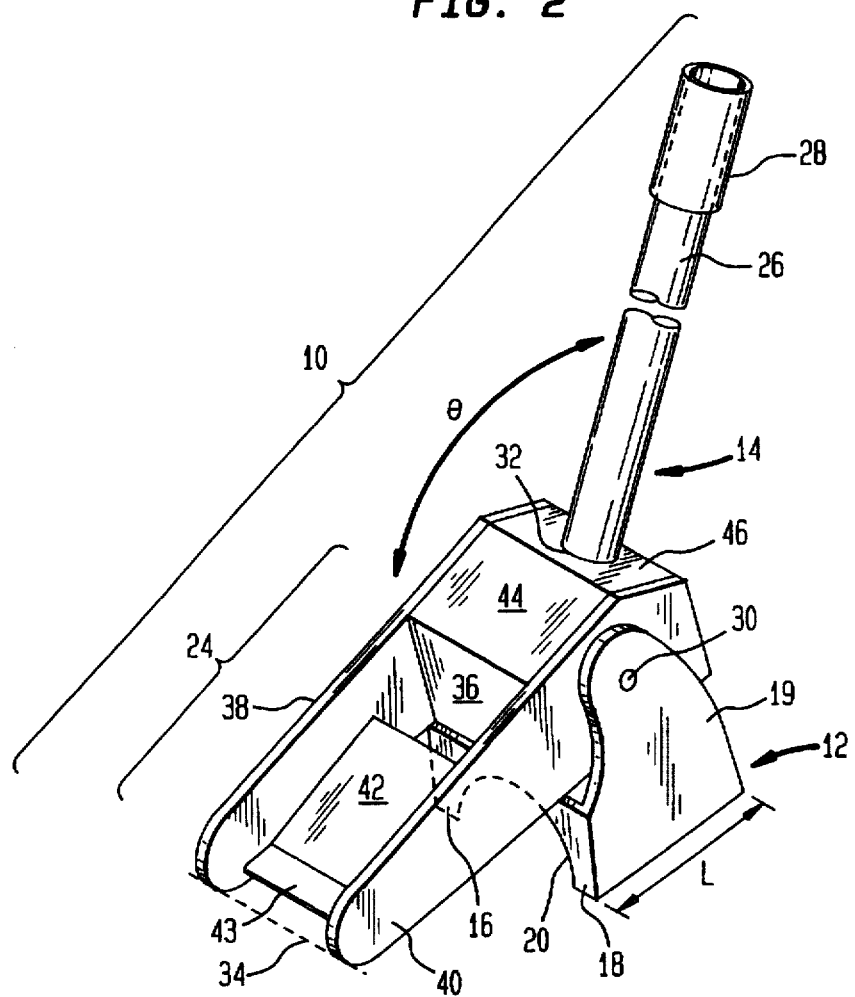
FIG. 2 is a perspective view of one embodiment of the load binder tool according to the present invention.

Referring now to FIG. 2, one embodiment of the load binder tool according to the present invention is shown and referenced generally by numeral 10. As will be described further below, tool 10 can be used to safely unlock a lever-type load binder. Tool 10 is typically constructed of high-quality steel parts that are shaped and welded according to methods well known in the art of tool construction. Furthermore, it is to be understood that the novel features of the present invention can be realized with a variety of constructions as will be evident following the description of two such constructions.

Figure 3:
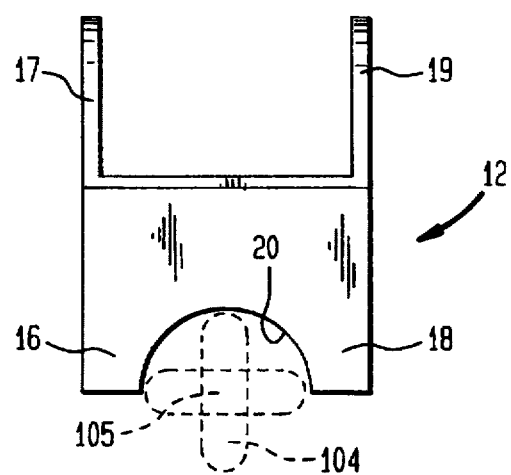
FIG. 3 is a head-on, isolated view of the base of the present invention as it sits astride a chain.

Tool 10 comprises a base 12 and a handle or leverage member 14. Base 12, also shown in isolation over chain 104 in FIG. 3, is a rigid component that defines a first leg 16 and a second leg 18 separated by an arcuately shaped channel 20. Leg extensions 17 and 19 extend upward from each of legs 16 and 18, respectively. Channel 20 is sized to receive a chain (e.g., chain 104) leading to a load binder. For reasons that will be described further below, channel 20 is sized so that each of legs 16 and 18 terminate at approximately the center longitudinal axis 105 of chain 104 on which base 12 will sit. To stabilize base 12 on chain 104, the length L of base 12 should be long enough to cover a plurality (e.g., typically four or more) of the links of chain 104.

Handle member 14 is also of rigid construction and defines a cradle 24 at one end thereof and a handle extension 26 at the other end thereof. The end of handle extension 26 can be provided in the hand grip 28. Handle member 14 is pivotally mounted to base 12 between cradle 24 and handle extension 26 by means of a hinge pin 30 passing through leg extensions 17, 19 and handle member 14. For reasons that will be described further below, handle member 14 forms an obtuse angle θ between cradle 24 and handle extension 26. The value of angle θ is preferably between approximately 145° and approximately 155°. The apex of angle θ, represented at point 32 in this embodiment, can occur at the point of mounting to base 12, i.e., at hinge pin 30, or between the point of mounting along handle extension 26.

Cradle 24 is a generally U-shaped cradle that is open on the one end, represented by dashed-line 34, of handle member 14 and extends to a stop plate or wall 36 positioned in front of hinge pin 30. In this embodiment, cradle 24 includes side plates 38 and 40 separated by bottom plate 42 and end wall 36. To avoid catching bottom plate 42 on a chain link during the use of tool 10, bottom plate 42 can be beveled or angled upward slightly (approximately 100° or so) at end 43. Note that side plates 38 and 40 extend past end wall 36 to receive hinge pin 30 therethrough. Additional support plates 44 and 46 are attached, e.g., welded between side plates 38 and 40 to provide additional strength and to provide a means for mounting, e.g., welding, handle extension 26.

Figure 4:
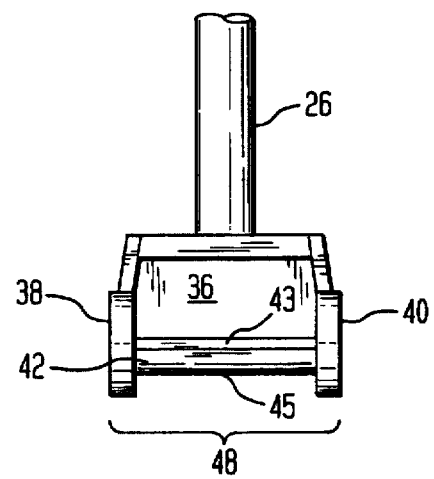
FIG. 4 is a head-on, isolated view of the cradle end of the handle member shown in FIG. 2.

Bottom plate 42 is further positioned between side plates 38 and 40 such that a generally U-shaped channel 48 faces in a direction opposite that of cradle 24. Specifically, channel 48 is defined between side plates 38 and 40 and the bottom face 45 of bottom plate 42 as best seen in the head-on, isolated view of FIG. 4. As will be described in detail below, cradle 24 receives the lever of a load binder that is to be unlocked while channel 48 serves as a guide that cooperates with the load binder chain when positioning tool 10. The upward angle on bottom plate 42 at end 43 thereof prevents plate 42 from catching on a chain link during use of tool 10.

Figure 5:
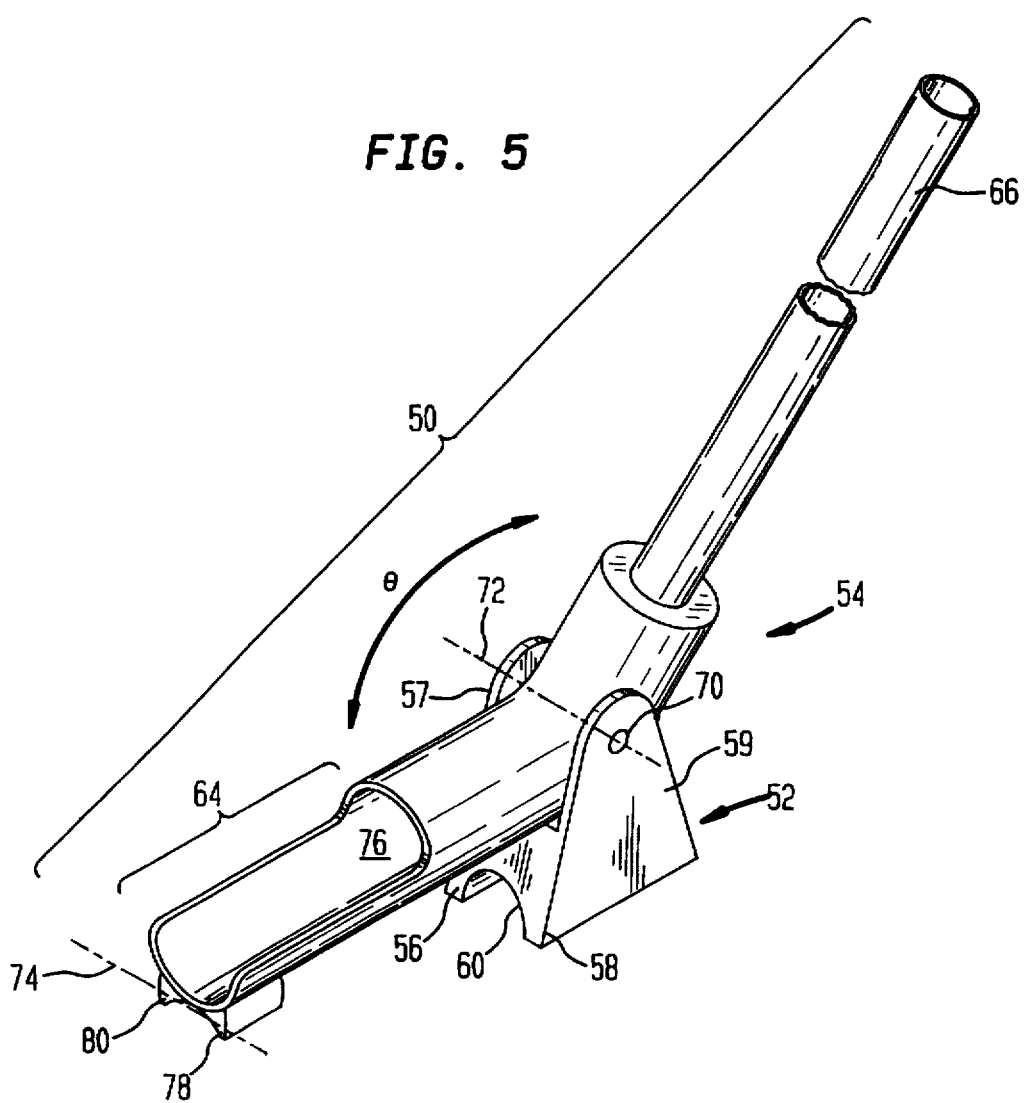
FIG. 5 is a perspective view of another embodiment of the load binder tool according to the present invention.

A second embodiment will now be described with reference to FIG. 5 where the inventive principles of the present invention are practiced in a simple construction. In FIG. 5, tool 50 consists of essentially the same two components as tool 10, namely, base 52 and handle member 54. However, base 52 is constructed from a single piece of shaped steel to define a first leg 56, second leg 58, arcuately shaped channel 60, and leg extensions 57, 59 all of which are analogous to first leg 16, second leg 18, channel 20 and leg extensions 17, 19, respectively, of tool 10.

Handle member 54 is constructed predominately from a single piece of steel tubular stock that is partially cut away at one end thereof to define a cradle 64 and handle extension 66 at the other end thereof. Handle member 54 is pivotally mounted to base 52 between cradle 64 and extension 66 by means of hinge pin 70. Pin 70 passes through leg extensions 57, 59 and the pipe forming handle member 54 at the apex of angle θ which is represented in FIG. 5 by dashed-line 72. Similar to the cradle in tool 10, cradle 64 is open at the end represented by dashed-line 74 and extends along handle member 14 to a stop plate or wall 76 welded in the cross-section of handle member 54. Wall 76 is positioned in front of hinge pin 70 relative to end 74.

Figure 6:
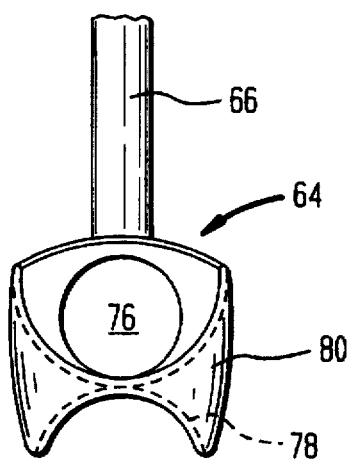
FIG. 6 is a head-on, isolated view of the cradle end of the handle member shown in FIG. 5.

Analogous to channel 48 in tool 10 is guide channel 78 in tool 50. By way of example, guide channel 78 can be formed from the portion of handle member 14 that was cut away to form cradle 64. The material forming guide channel 78 is attached, e.g., welded, to the underside of cradle 64 and faces in a direction opposite that of cradle 64 as best seen in the end view of FIG. 6. At end 74 between cradle 64 and guide channel 78, a plate 80 can be attached, e.g., welded, therebetween for additional strength.

Figure 7A:
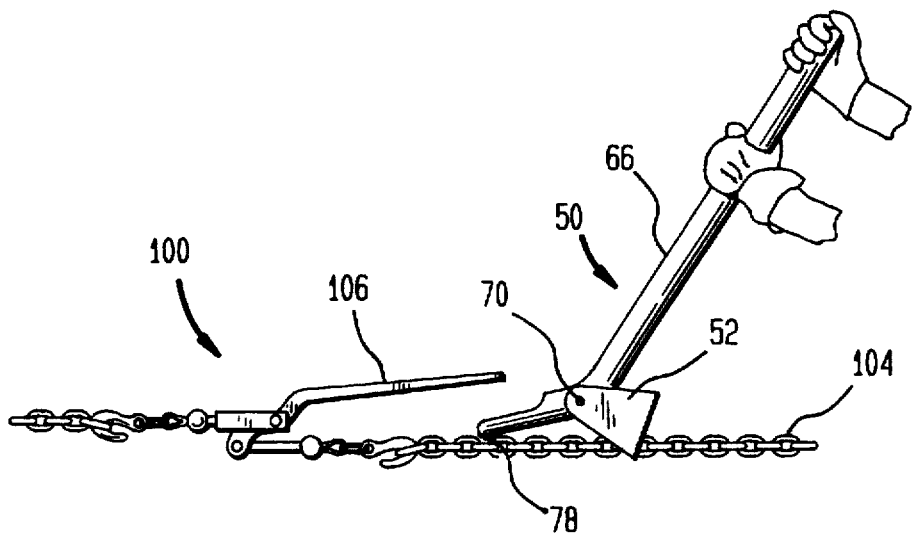
FIGS. 7A–7D depict an operational sequence in which the embodiment of FIG. 5 is used to release a load binder where
Figure 7B:
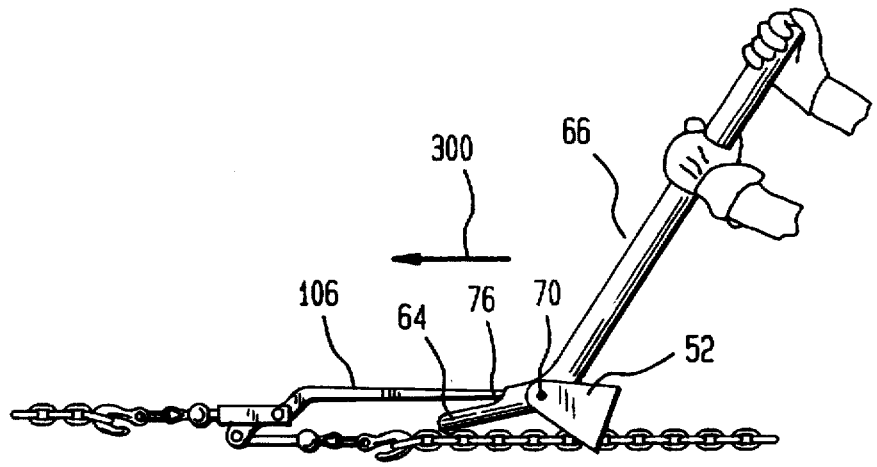
Figure 7C:
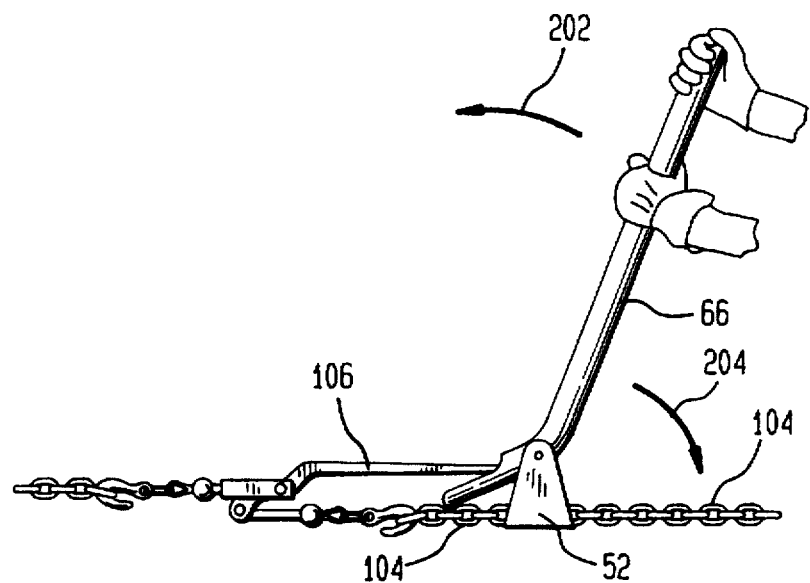
Figure 7D:
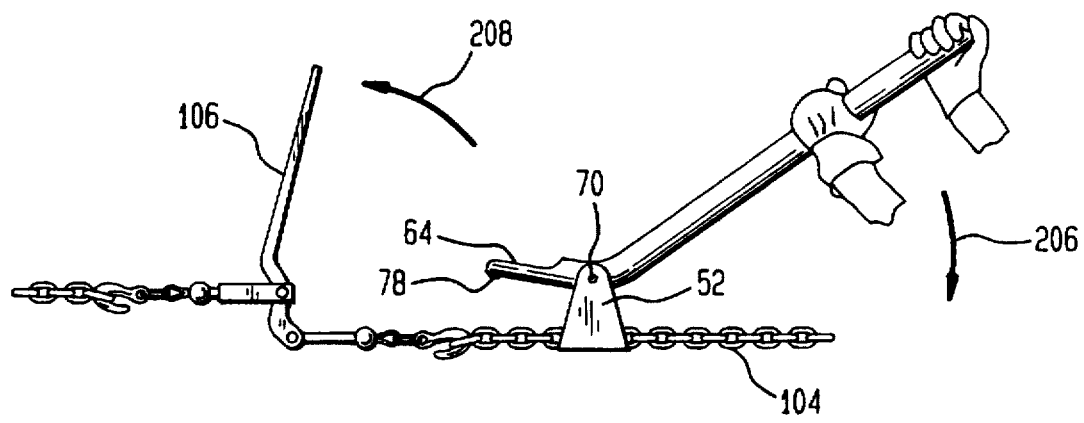

Operation of the present invention will now be described with the aid of FIGS. 7A-7D which depict the sequence of steps used to safely unlock a lever-type load binder. While both embodiments are operated in the same fashion, the embodiment in FIG. 5 will be used to describe such operation. In FIG. 7A, load binder 100 is shown with its lever 106 in the locked position such that chain 104 is under substantial tension. Tool 50 is positioned over chain 104 with guide channel 78 centered on chain 104. Base 52 is free to pivot about hinge pin 70 and is typically rotated back toward handle extension 66 as shown. As shown in FIG. 7B, tool 50 is slid along chain 104 in the direction of arrow 200 using guide channel 78 so that cradle 64 slides under lever 106. Movement in the direction of arrow 200 continues until the end of lever 106 contacts wall 76. Handle extension 66 is then moved in the direction of arrow 202 as shown in FIG. 7C so that base 52 can pivot downward in the direction of arrow 204. Movement of handle extension 66 in the direction of arrow 202 continues until channel 60 (not visible in FIG. 7C) of base 52 seats on chain 104 as described above. The final step is shown in FIG. 7D where handle extension 66 is moved in the direction of arrow 206. Such movement causes base 52 to act as a fulcrum as cradle 64 pivots up. The upward force imparted by cradle 64 causes lever 106 to move in the direction of arrow 208. As is the case with standard load binders, lever 106 will snap with great force in the direction of arrow 208 once it moves through an arc of approximately 30°. At this point, lever 106 catapults out of cradle 64 to unlock load binder 100 and loose the tension in chain 104.

The advantages of the present invention are numerous. The user of the tool is always positioned away from the release of force in the load binder's lever. Further, since the tool only cradles the lever, the tool need not follow the lever's motion as the great releasing force is unleashed. The obtuse angle formed by the handle member of the present invention prevents the user's hands from smashing into the chain as the load binder is being unlocked (see FIG. 7D). In addition, the present invention is operated with a downward force (in the direction of arrow 206 in FIG. 6D) as opposed to a lifting force which has a greater chance of causing a back injury. The present invention is operated in accordance with a simple four-step process that guarantees that the user is out of harm's way. Finally, the present invention can also be used to lock a load binder if handle extension 66 (or handle extension 26) is a hollow tube that can fit over the load binder's lever.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A tool for use with a lever-type load binder, comprising:
   a base member;
   a handle member having a first end and a second end, said handle member pivotally mounted to said base member at a pivot point between said first end and said second end;
   a portion of said handle member defining a generally U-shaped cradle open at said first end and terminating at an end wall prior to said pivot point, said U-shaped cradle sized to receive the lever of said lever-type load binder; and a generally U-shaped guide channel at said first end, said U-shaped guide channel facing in a direction opposite that of said U-shaped cradle.

2. The tool as in claim 1 wherein said handle member is shaped to define an obtuse angle between said first end and said second end.

3. The tool as in claim 2 wherein the apex of said obtuse angle coincides with said pivot point.

4. The tool as in claim 3 wherein the apex of said obtuse angle is between said pivot point and said second end.

5. The tool as in claim 2 wherein said obtuse angle is between approximately 145° and approximately 155°.

6. The tool as in claim 1 wherein said second end of said handle member defines a hollow tube.

7. A tool for use with a lever-type load binder that cooperates with a chain wrapped about goods to place said chain in tension about said goods, said tool comprising:

a fulcrum member having a base portion defined by first and second legs separated by a channel, wherein said first leg and said second leg sit astride said chain with said chain passing through said channel when said fulcrum member is placed over said chain;

a lever member having a first end and a second end, said handle member pivotally mounted to said fulcrum member above said base portion at a pivot point between said first end and said second end;

a portion of said lever member defining a generally upwardly facing U-shaped cradle open at said first end and terminating at an end wall prior to said pivot point, said U-shaped cradle facing in a substantially opposite direction from that of said channel and sized to receive and cradle the lever of said lever-type load binder; and a generally U-shaped guide channel at said first end, said U-shaped guide channel facing in a direction opposite that of said U-shaped cradle.

8. The tool as in claim 7 wherein said channel is sized such that said first leg and said second leg terminate at approximately a center longitudinal axis of said chain when said first leg and said second leg sit astride said chain.

9. A tool as in claim 7 wherein said lever member is shaped to define an obtuse angle between said first end and said second end.

10. The tool as in claim 9 wherein the apex of said obtuse angle coincides with said pivot point.

11. The tool as in claim 9 wherein the apex of said obtuse angle is between said pivot point and said second end.

12. The tool as in claim 9 wherein said obtuse angle is between approximately 145° and approximately 155°.

13. The tool as in claim 7 wherein said second end of said lever member defines a hollow tube.

* * * * *